UNITED STATES PATENT OFFICE.

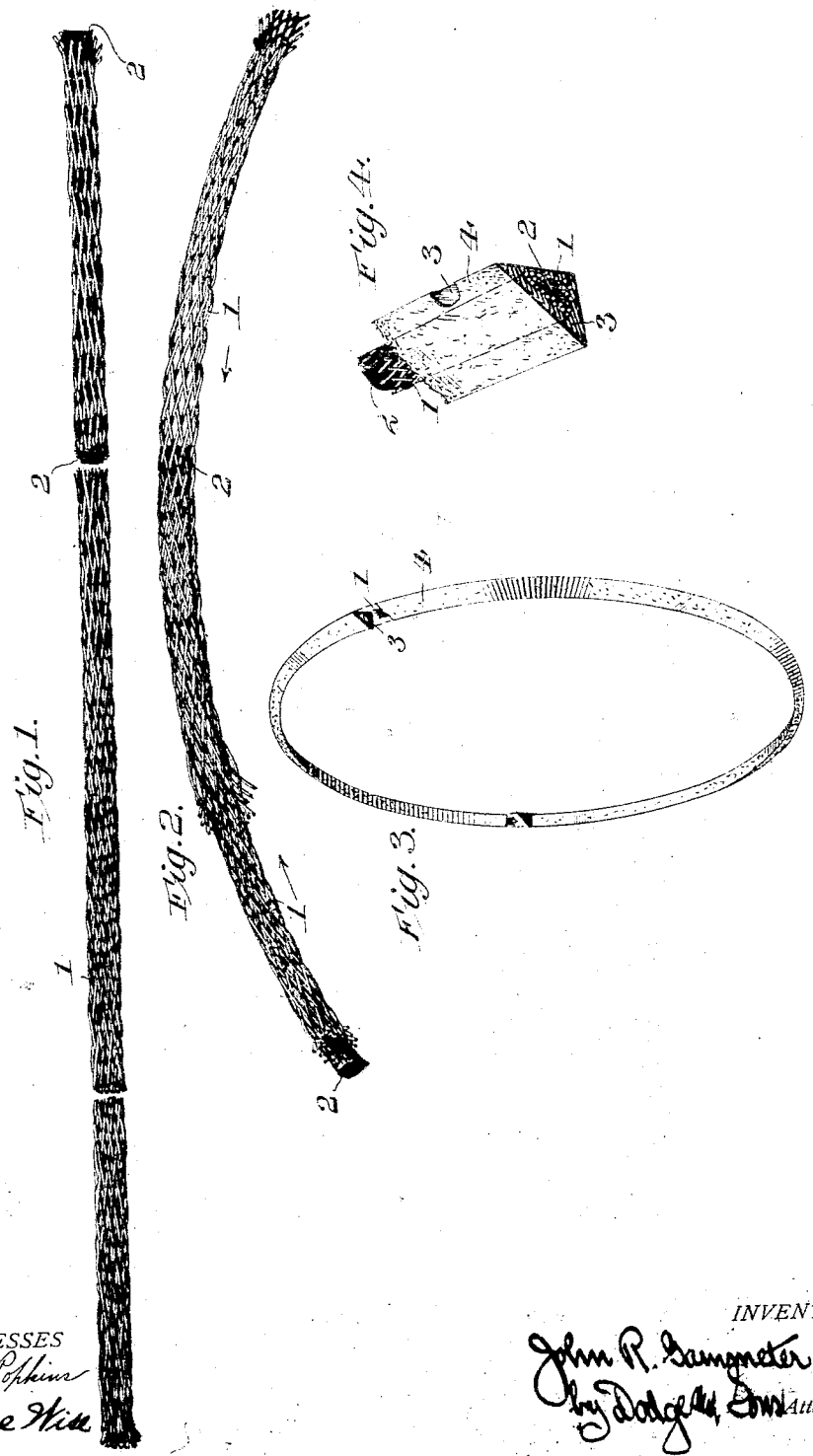

JOHN R. GAMMETER, OF AKRON, OHIO, ASSIGNOR, BY MESNE ASSIGNMENTS, TO THE B. F. GOODRICH COMPANY, A CORPORATION OF NEW YORK.

METHOD OF PRODUCING BEADS FOR TIRES.

1,125,303.  Specification of Letters Patent.  Patented Jan. 19, 1915.

Application filed December 19, 1911. Serial No. 666,648.

*To all whom it may concern:*

Be it known that I, JOHN R. GAMMETER, a citizen of the United States, residing at Akron, in the county of Summit and State of Ohio, have invented certain new and useful Improvements in Methods of Producing Beads for Tires, of which the following is a specification.

My present invention pertains to an improved method of producing beads for tires.

The bead and the manner in which it is formed, in so far as the same is susceptible of illustration, are disclosed in the annexed drawings, wherein:

Figure 1 is an elevation of a portion of the tubular wire fabric and the inclosed rubber core which go to form the main body and strengthening element of the bead; Fig. 2 a similar view, the tubular fabric being shown as partly telescoped or "swallowed"; Fig. 3 a perspective view of the completed bead; and Fig. 4 a section of the bead, shown on a somewhat larger scale.

The main object of the present invention is to produce a bead structure in which the wire strengthening element is substantially continuous, it being formed from a continuous tubular structure which is telescoped within itself, so as to produce a complete annulus, the various layers of which interlock with each other and thus prevent slipping and elongation of the structure as a whole.

A further object of the invention is to provide a core-piece for the metallic member, which, when vulcanized, becomes hard, and by reason of the pressure exerted by the molds is forced outwardly into and through the meshes of the various superincumbent layers of the tubular wire fabric, interlocking such layers, and being likewise autogenously joined to the outer layers of rubber or rubber fabric which are placed about the metallic element. Assuming, for instance, that it be desired to produce a 30-inch bead, one takes a piece of tubular wire braid 1, 24 feet long, and inserts therein, at one end, a piece of unvulcanized india rubber 2, approximately nine feet long, after which the tubular fabric is telescoped or caused to swallow itself in the manner indicated in Fig. 2. This action is continued until the ends of the rubber core 2 abut, at which time the annulus formed by the superincumbent layers of tubular woven wire fabric will have a diameter slightly less than the desired diameter of the finished bead. The mesh of the braided wire tube is quite open or braided with a long pitch, so that when the metallic element thus produced is surrounded or embedded in a body of rubber 3, which is preferably covered by a layer of cloth 4, see Fig. 4, and the whole subjected to pressure and vulcanization in a suitable mold, the braid will lengthen slightly, reaching its limit of elongation at the desired diameter of the bead.

The various wires of the superincumbent layers tend to interlock somewhat, even before the bead is vulcanized, and when subjected to pressure and the rubber core 2 is cured and becomes hard after having passed to a greater or less extent into the meshes of the wire fabric, said fabric becomes thoroughly interlocked throughout, and in effect is a continuous member, without joint.

The construction, while being strong and firm, moreover places an equal, or substantially equal, strain upon the various wires throughout, whereby each wire is made to take its proper share of the strain.

Under actual test it has been found impossible to cause the layers of the tubular wire fabric, after the parts are vulcanized, to slip on each other; consequently there can be no elongation of the bead from that cause; furthermore, no elongation can take place by reason of stretching of the wire fabric, as the stretch is taken out as the bead is slightly enlarged when placed and cured within the mold.

No claim is herein made to the bead produced by the method above set forth, that forming the subject-matter of a divisional application filed by me the 3rd day of September, 1912, Serial No. 718,310.

Having thus described my invention, what I claim is:

1. A step in the method of producing beads for tires, which consists in placing a rubber core within one end of a relatively long tubular braided wire fabric; and telescoping the fabric upon itself until the interior is filled by the core.

2. The method of producing beads for tires, which consists in placing a rubber core within one end of a relatively long tubular wire fabric; telescoping the fabric upon itself until the ends of the core abut; surrounding the fabric thus fashioned with a body of rubber; and finally vulcanizing the core and rubber body.

3. The method of producing beads for tires, which consists in placing a rubber core within one end of a relatively long tubular wire fabric, said core being of such composition as to become relatively hard when vulcanized; telescoping the fabric upon itself until the core fills the tubular fabric; surrounding the fabric thus fashioned with a body of rubber; and finally vulcanizing the structure.

4. The method of producing beads for tires, which consists in placing a rubber core within one end of a relatively long tubular braided wire fabric; telescoping the fabric upon itself until the interior thereof is fully occupied by the core; surrounding the fabric thus positioned by a body of rubber; and finally stretching and vulcanizing the structure.

5. The method of producing beads for tires from an open-mesh, tubular, braided fabric, which consists in telescoping the fabric upon itself to produce an annulus of a diameter slightly less than that ultimately desired, said annulus having a rubber core therein and being surrounded by a body of rubber; and finally stretching the annulus and vulcanizing the rubber within and around the same.

In testimony whereof I have signed my name to this specification in the presence of two subscribing witnesses.

JOHN R. GAMMETER.

Witnesses:
 WALKER I. MEANS,
 ROBERT W. AITKER.